United States Patent [19]

Shimei

[11] Patent Number: 5,058,461
[45] Date of Patent: Oct. 22, 1991

[54] AUTOMATIC TRANSMISSION CONTROL DEVICE

[75] Inventor: Masato Shimei, Nagoya, Japan
[73] Assignee: Aisin Seiki Kabushiki Kaisha, Kariya, Japan
[21] Appl. No.: 587,847
[22] Filed: Sep. 25, 1990

[30] Foreign Application Priority Data

Sep. 30, 1989 [JP] Japan .................. 1-253748

[51] Int. Cl.$^5$ .................. F16H 61/06; F16H 61/08
[52] U.S. Cl. .................................................. 74/866
[58] Field of Search ..................................... 74/866

[56] References Cited

U.S. PATENT DOCUMENTS

| | | | |
|---|---|---|---|
| 4,674,364 | 6/1987 | Shindo et al. | 74/866 X |
| 4,706,522 | 11/1987 | Nitz | 74/866 |
| 4,727,773 | 3/1988 | Sumiya et al. | 74/866 X |
| 4,800,497 | 1/1989 | Koori et al. | 74/866 X |
| 4,882,952 | 11/1989 | Kashihara et al. | 74/866 X |
| 4,928,557 | 5/1990 | Takada et al. | 74/866 X |

*Primary Examiner*—Dirk Wright
*Attorney, Agent, or Firm*—Burns, Doane, Swecker & Mathis

[57] ABSTRACT

An automatic transmission shift control device has multiple friction engaging elements, and a shift timing valve port, a port for an underlap operating control-mode. A timing solenoid valve, a throttle sensor, an automobile speed sensor, and a controller operate the timing solenoid valve by signals from the throttle sensor and the automobile speed sensor. A shift map having an overlap area and an underlap area determines position of the shift timing valve within those areas. The shift timing valve being changed independent of the position in the areas determined by the degree of throttle opening and the automobile speed.

2 Claims, 7 Drawing Sheets

AUTOMATIC TRANSMISSION CONTROL DEVICE

BACKGROUND OF THE INVENTION

1. Field of the Invention

The invention relates to an automatic transmission control device in which gears of the transmission are shifted or changed by a plurality of friction engaging elements.

2. Description of the Related Art

Figure 6:
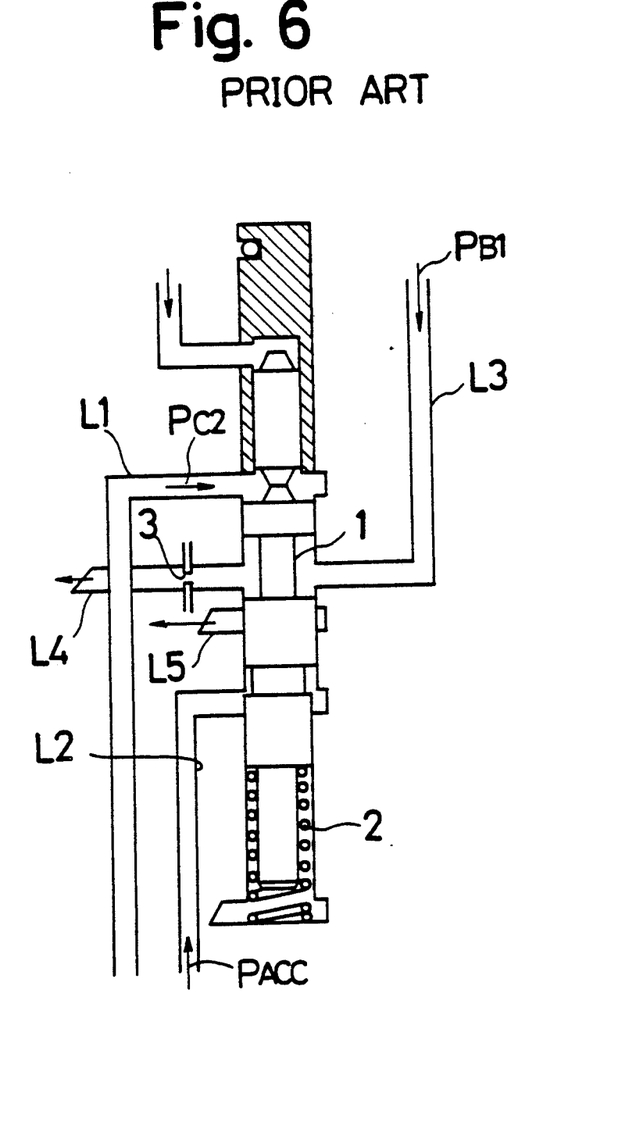
FIG. 6 shows a sectional view of a shift timing valve of the Prior Art.

Shift control systems of an automatic transmission are operated, on the one hand, by a combination of one-way clutches, multiple friction engaging elements (clutches, brakes) and band brakes and, the other hand, by a combination of multiple friction engaging elements (clutches, brakes). The shift control system includes a timing control for timing the intake and exhaust of the hydraulic operating oil supply from an operating means of a friction engaging element. The timing control can operate to exhaust the hydraulic operating oil when the oil pressure on the intake side of the operator of the friction element reaches a predetermined pressure value. This type of a timing control is operated by, for example, a shift timing valve shown in a manual for the Toyota Landcruiser New Automobile, lines 10–36, and FIG. 6 (published in 1984). The timing valve therein is a 2→3 shift timing valve which controls timing for draining the oil pressure of the brake B1 when the system is shifted from the 2nd gear to the 3rd gear so as to disengage the brake B1 and engage the clutch C3. The timing valve reduces the shift-shock which occurs during the shift between gear ratios. In the 2→3 shift timing valve, a spool 1 is urged to the upper position by the spring 2 while the vehicle is operated in the second gear. When changing to the third gear, the engaging oil pressure $P_{c2}$ of the rear clutch $C_2$ is transmitted through an orifice (not shown) from the 2→3 shift valve via passage $L_1$. The spool 1 is then urged to the lower position against the oil pressure $P_{ACC}$ transmitted from the accumulator control valve through the passage $L_2$ and against the force of the spring 2. When the spool 1 is moving to the lower position and the oil pressure $P_{C2}$ does not increase sufficiently, the oil pressure $P_{B1}$ of the brake B1 transmitted through the passage $L_3$ only passes through the passage $L_4$ and the orifice 3. Therefore, the engagement of the second brake B1 is maintained. When the engaging oil pressure $P_{C2}$ of the clutch $C_2$ increases further and the spool 1 moves further to a lower position, the passage $L_5$ provided below the orifice 3 is opened and the oil pressure $P_{B1}$ is quickly reduced and the engagement of the brake B1 is released. At this time, the oil pressure of the rear clutch $C_2$ is changed to a pressure, the range of which overlaps slightly with the pressure range of the second brake B1, and the rear clutch $C_2$ is engaged. Thereby, the shifting to the third gear ratio is completed.

Figure 7:
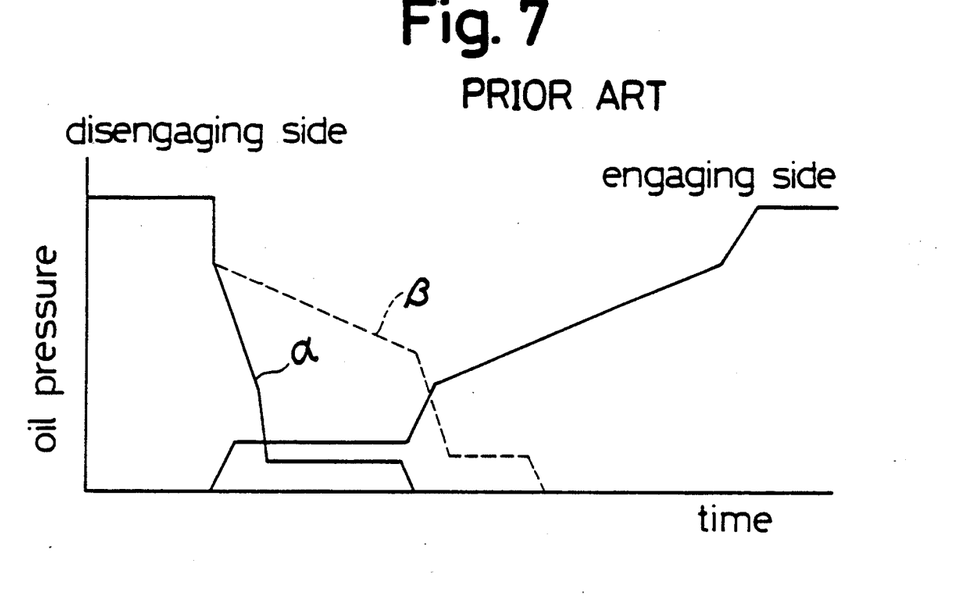
FIG. 7 shows an oil pressure characteristic of the shift timing valve of FIG. 6.
Figure 8:
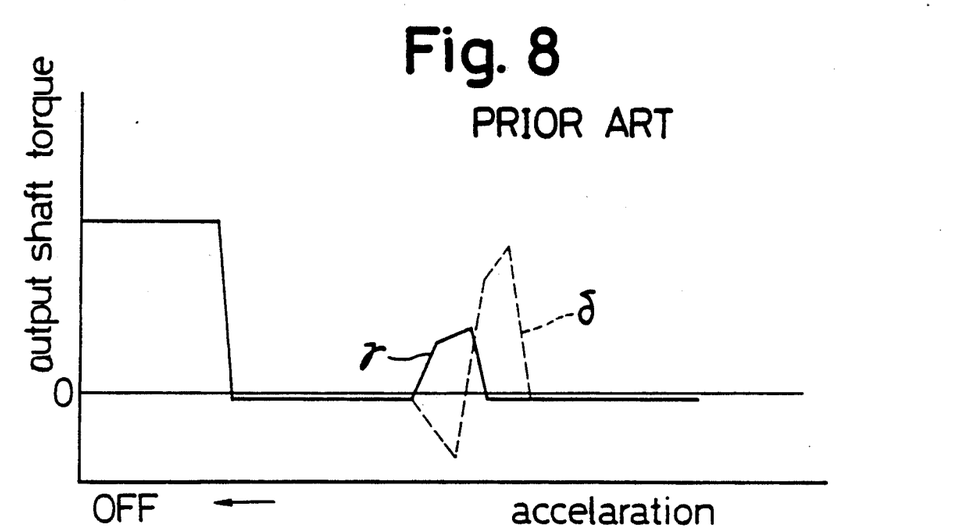
FIG. 8 shows a torque characteristic of an output shaft of a transmission utilizing the shift timing valve of FIG. 6.

In the up shift of the automatic transmission, there is a power-off up-shift and a power-on up-shift. The power-off up-shift, using a combination of the multiple friction engaging elements employs an underlap control to quickly release the engaging element of the disengaging side and to slowly engage the engaging element of the engaging side, as shown in FIG. 7 by a full Line $\alpha$. When the overlap control, shown in FIG. 7 by a dotted line $\beta$, is carried out at the power-off up-shift, the throttle pressure is in a reduced condition and the change of the output torque of the overlap control shown by the dotted line $\delta$ of FIG. 8 is greater than the one of the underlap control shown by the full line $\gamma$, therefore the shift shock also becomes greater.

In the above-mentioned conventional shift timing control at the up-shift, the change of the shift timing valve is performed in relation to the accumulator back pressure modulated by the engaging oil pressure of the engaging side and the throttle pressure and is not affected by the speed of the automobile. During the up-shift either the underlap control or the overlap control is selected dependent on whether the degree of throttle opening is within a certain range. In fact, however, not only the degree of throttle opening but also the automobile speed (the output revolution) is decisive.

For example, when the degree of throttle opening is large enough during the power-off up-shift, the underlap control is not required. By contrast when the degree of throttle opening is not large enough in the power-on up-shift, the underlap control is required and the degree of throttle opening is different in relation to the automobile speed.

Therefore, in the above-discussed conventional shift timing control, the shift shock is not sufficiently reduced.

SUMMARY OF THE INVENTION

It is an object of the invention to provide an improved automatic transmission control device which obviates the above-conventional drawbacks.

In order to accomplish the object, an automatic transmission control device is provided with a first multiple friction engaging element, a second multiple friction engaging element engaged for the purpose of the up-shift when the first multiple friction engaging element is released, a shift timing valve having a return spring and a port for overlap control, the port being changed so that an engaging oil pressure of the first multiple friction engaging element is quickly reduced when the force transmitted by the engaging oil pressure of the second multiple friction engaging element supplied into the timing valve is larger than the force transmitted by an accumulator back pressure modulated by the return spring and throttle pressure from a throttle valve, an oil pressure is supplied to the part acting in the same direction on the engaging oil pressure of the second multiple friction engaging element, a solenoid timing valve communicated with a passage connected to the port, a throttle open sensor means, an automobile speed sensor means, a control means operating the timing solenoid valve by means of signals from the throttle open sensor means and the automobile speed sensor means, and a shift map having a boundary fixed in a range in which the automobile speed is higher than a shift line, the throttle open being larger the higher the automobile speed. An overlap area is fixed between the boundary and the shift line, and an underlap area is fixed in the range where the automobile speed is higher than the boundary, and the control means changes the shift timing valve according to the shift map to open the passage by the timing solenoid valve, when a point defined by the degree of throttle open and the automobile speed is in the overlap area, and to close the passage by the solenoid timing valve and supply an oil pressure to a port when the point is in the underlap area.

DETAILED DESCRIPTION OF THE INVENTION

In a gear train of an automatic transmission of the type shown in FIG. 1 according to the invention, shifting of the transmission is effected by a shift control of a solenoid valve, and the operations of multiple element friction engaging devices in each gear ratio are shown in the following Table 1.

TABLE 1

Figure 1:
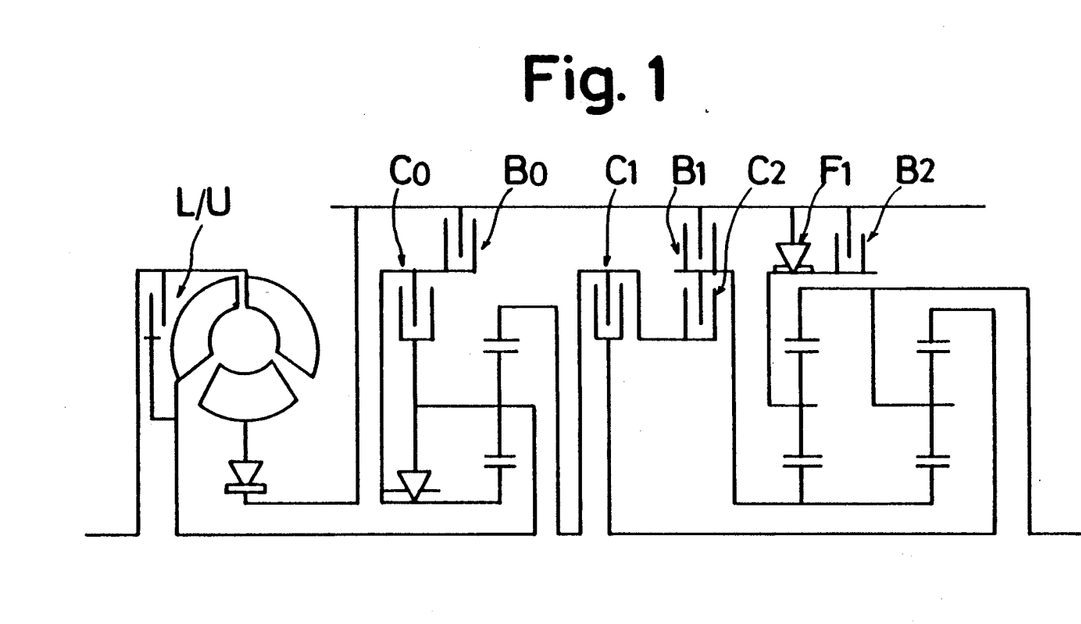
FIG. 1 shows a schematic representation of a gear train of an automatic transmission of the invention.
Figure 2:
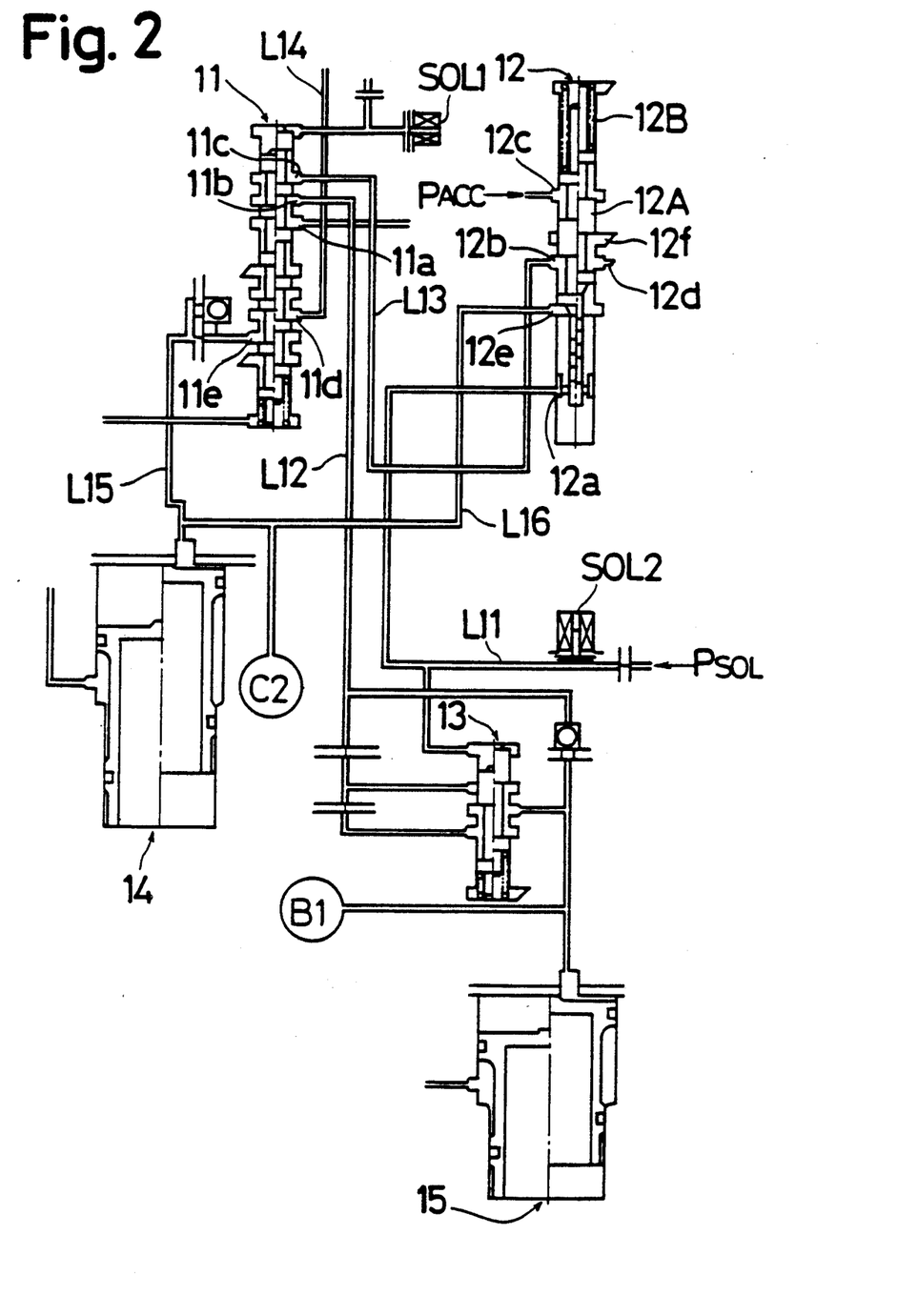
FIG. 2 shows an embodiment of an oil pressure control circuit of the invention.

|   | C0 | C1 | C2 | B0 | B1 | B2 |
|---|---|---|---|---|---|---|
| P | O | X | X | X | X | X |
| R | O | X | O | X | X | O |
| N | O | X | X | X | X | X |
| D |   |   |   |   |   |   |
| 1 | O | O | X | X | X | X |
| 2 | X | O | X | X | O | X |
| 3 | O | O | O | X | X | X |
| O/D | X | O | O | O | X | X |
| 2 |   |   |   |   |   |   |
| 1 | O | O | X | X | X | X |
| 2 | O | O | X | X | O | X |
| L | O | O | X | X | X | O | where
SOL1: normally closed type solenoid valve
SOL2: normally opened type solenoid valve FIG. 2 shows a part of an oil control circuit communicating with the gear train in FIG. 1. A reference number 11 indicates a 2→3 shift valve, 12 indicates a 2→3 shift timing valve, 13 indicates a B₁ brake orifice control valve, 14 indicates a C₂ clutch accumulator and 15 indicates a B₁ brake accumulator. SOL1 is a 2→3 shift solenoid valve and SOL2 is a timing solenoid valve provided in an oil passage L₁₁ connected to an underlap control port 12a of the 2→3 shift timing valve 12.

Figure 3:
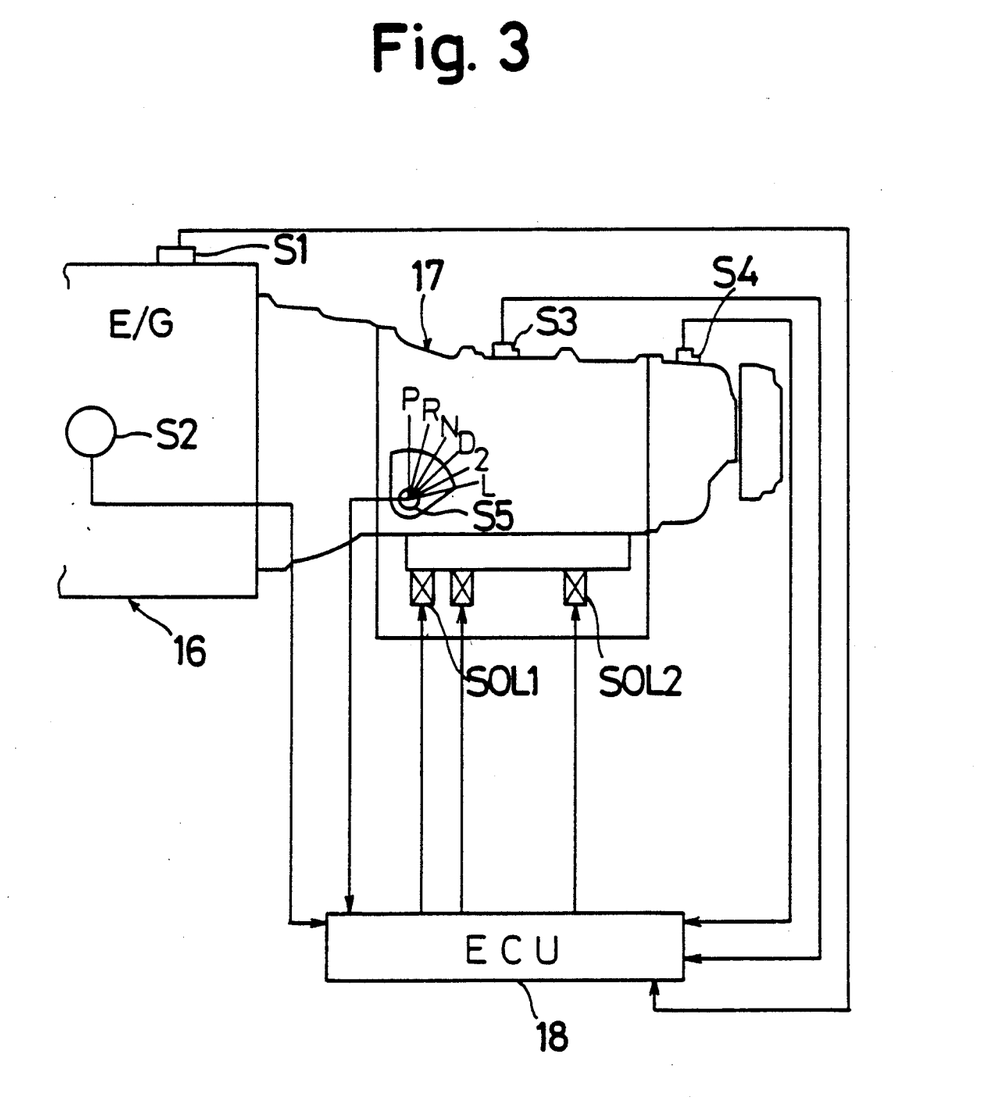
FIG. 3 shows a control system used in the embodiment of FIG. 2.

In FIG. 3, reference number 16 indicates an engine, 17 indicates an automatic transmission, S₁ indicates an engine rotational speed sensor, S₂ indicates a throttle sensor, S₃ indicates a C₁ clutch drum rotational speed sensor, S₄ indicates an output shaft rotational speed sensor, and S₅ indicates a shift lever position sensor. The 2→3 shift solenoid valve SOL1 and the timing solenoid valve SOL2 are operated by a signal from a microcomputer 18.

In the oil pressure control device of the automatic transmission, when the 2→3 shift valve 11 is changed (in the left valve condition in FIG. 2) at the 2→3 shift-up, an oil pressure supplied from a 1→2 shift valve (not shown) to a port 11a is cut off, and a port 11b supplying an oil pressure to brake B₁ is opened to a port 11c transmitting an oil pressure to the 2→3 shift timing valve 12. Thereby, an oil pressure (B₁ oil pressure) from the Brake B₁ and the B₁ accumulator 15 is supplied to the port 12b of the 2→3 shift timing valve 12 through the passage L12, the 2→3 shift valve port 11b, the port 11c and the passage L13. At this time, the spool 12A of the 2→3 shift timing valve 12 is located in the lower portion (in the left valve condition in FIG. 2) due to the return spring 12B and an accumulator back pressure supplied from an accumulator (not shown) to the port 12c. Therefore, the B₁ oil pressure supplied to the port 12b is reduced by draining the oil through an orifice 12d, and the oil pressure of the brake B₁ slowly decreases. The 2→3 shift valve 11 is changed by the 2→3 shift-up, the port 11d is communicated with the port 11e, and the line pressure supplied through the passage L14 is supplied to the clutch C₂ through the passage L15. At the same time, the line pressure (C₂ oil pressure) supplied to the clutch C₂ is supplied to the port 12e of the 2→3 shift timing valve 12 through the passage L16, and acts in the opposite direction of the return spring 12B and the accumulator back pressure $P_{ACC}$ from the port 12c against the spool 12A. After the piston stroke of the clutch C₂, for engaging the multiple friction elements has been completed and the C₂ oil pressure supplied to the 2→3 shift timing valve 12 has reached a fixed valve, the spool 12A moves up against the spring 12B and the accumulator back pressure $P_{ACC}$ (in the right valve condition in FIG. 2). Thereby the port 12b is communicated with the drain port 12d, and the B₁ brake oil pressure is quickly reduced by draining the oil through the port 12d.

At this time, the force balance on the valve spool of the 2→3 shift timing valve 12 is the following:

$$S1 \times P_{C2} \geqq F + \Delta S \times P_{ACC} \quad (1)$$

wherein

S1: a pressure area of $P_{C2}$;
F: a spring force of the return spring 12B; and
ΔS: a pressure area of the accumulator back pressure $P_{ACC}$ When the oil pressure $P_{C2}$ satisfies the formula (1), the 2→3 shift timing valve 12 is changed.

On the one hand, when the timing solenoid valve SOL2 is "ON", the solenoid oil pressure $P_{SOL}$, modulating the line pressure, is supplied to the port 12a of the 2→3 shift timing valve 12 through the passage L₁₁ and acts in the opposite direction to the return spring 12B and the accumulator back pressure $P_{ACC}$ against the spool 12A. At this time the force balance of the 2→3 shift timing valve 12 is the following:

$$(S_1 - S_2) \times P_{C2} + S_2 \times P_{SOL} = F + \Delta S \times P_{ACC} \quad (2)$$

where:

S2: a pressure area of $P_{SOL}$.

When the solenoid oil pressure $P_{SOL}$ and the pressure area S₂ are large enough, the spool 12A moves upward without regard to the oil pressure $P_{C2}$, and the 2→3 shift timing valve is changed.

Figure 4:
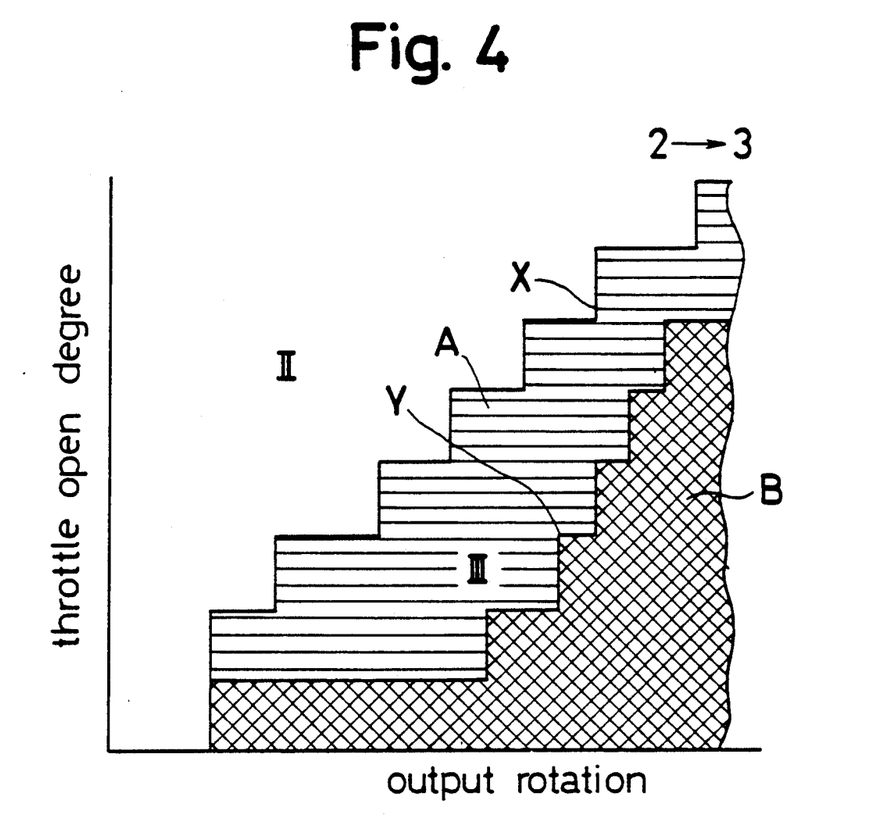
FIG. 4 shows a shift map used in the embodiment of FIG. 2.

FIG. 4 shows a shift map stored in a microcomputer 18 in FIG. 3, and the X line indicates the 2→3 shift line. In the 3rd (III) area of the shift map, a boundary Y increases step-by-step, i.e., the greater the output rotation, the greater the degree of throttle opening.

The overlap area A is fixed between the 2→3 shift line X and the boundary Y, and the underlap area B is below the boundary Y. In the map, at the 2→3 shift-up, when the point determined by the degree of throttle opening and the output rotational (automobile) speed is in the overlap area A, the computer is operated in the overlap control-mode without regard to the power-off up-shift or the power-on up-shift and when the point is in the underlap area B, the computer is operated in the underlap control mode.

Figure 5:
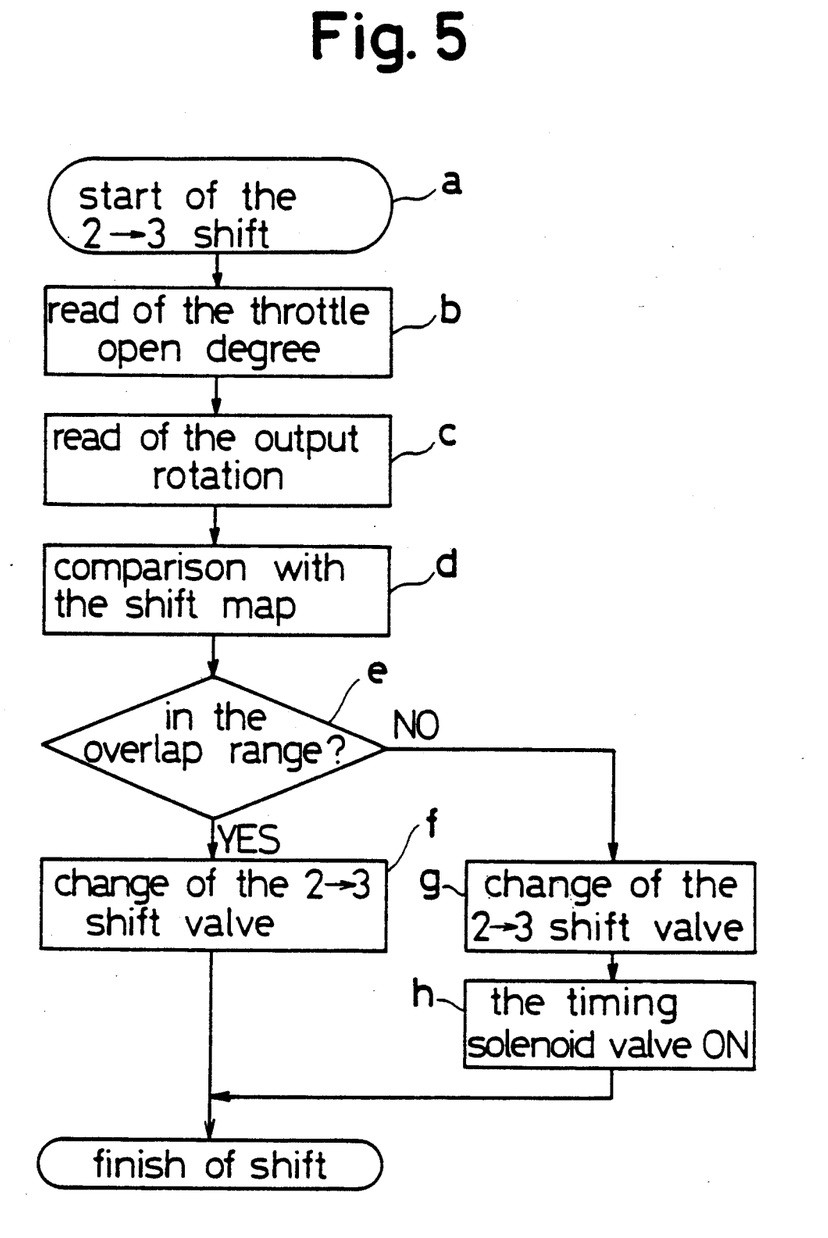
FIG. 5 shows a flow chart showing a control path of the embodiment according to FIG. 2.

In FIG. 5, determining the beginning of the 2→3 shift-up (a), the microcomputer 18 reads the degree of throttle opening from the signal of the throttle sensor $S_2$ (b) and further reads the output rotational speed from the signal of the output rotational speed sensors $S_4$ (C). The microcomputer 18 continually compares the point determined by the degree of throttle opening and the output rotational speed with the shift map of FIG. 4 (d), and decides whether the point is in the overlap area A or the underlap area B (e). If the point is in the overlap range A (YES), the 2→3 shift valve 11 (the 2→3 shift solenoid valve SOL1) is changed (f), and the timing solenoid valve SOL2 is maintained at "OFF". At this time, the 2→3 shift timing valve 12 is changed according to the formula (1), i.e., changed when the $C_2$ oil pressure of the engaging side in the port 12e reaches a predetermined value. Therefore, the $B_1$ brake oil pressure of the disengaging side has a characteristic shown by the dotted line $\beta$ in FIG. 7, and at this time the 2→3 shift causes the overlap control mode. On the other hand, if the point is in the underlap area B (NO), the 2→3 shift valve 11 (the 2→3 shift solenoid valve SOL1) is changed (g), and the timing solenoid valve SOL2 is changed to "ON" (h). The 2→3 shift timing valve 12 is changed according to the formula (2), namely the timing solenoid valve SOL2 is changed to "ON", the solenoid oil pressure $P_{SOL}$ is supplied from the oil passage $L_{11}$ to the port 12a of the 2→3 shift timing valve 12 in FIG. 2, and urges the spool 12A independently of the $C_2$ oil pressure in the port 12e, and thereby the 2→3 shift timing valve 12 is changed. Therefore, the oil pressure of the brake $B_1$ on the disengaging side of the multiple friction engaging element has a characteristic shown by the full line $\alpha$ in FIG. 7, and at this time the 2→3 up-shift causes the underlap control.

The shift control the 2→3 up-shift by the 2→3 shift timing valve is explained above. However, when the automatic transmission uses another shift timing valve (for example, a 1→2 or a 3→4 shift timing valve) the shift control also functions in the same manner as the 2→3 up-shift.

As described above, at the up-shift of the automatic transmission, it is decided according to the parameter of the throttle open degree and the automobile speed, whether the overlap control-mode or the underlap control-mode shall be effective irrespective of the power-on up-shift or the power-off up-shift. Therefore, in comparison with the conventional shift control, the invention permits the selection of the most suitable shift condition according to the driving condition, and permits effective reduction of the shift shock.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

I claim:

1. An automatic transmission shift control system, comprising:

a first multiple element friction engaging device, a second multiple element friction engaging device engaged for the purpose of the up-shaft when said first multiple element friction engaging is disengaged, a shift timing valve having a return spring and a port for underlap control of the transmission shift, the port permitting an engaging oil pressure of said first multiple element friction engaging device to be quickly reduced when force transmitted by an engaging oil pressure of said second multiple element friction engaging device supplied to said timing valve is greater than the force transmitted by an accumulator back pressure modulated by said return spring and a throttle pressure provided from a throttle valve, an oil pressure supplied to the port acting in the same direction as said engaging oil pressure of said second multiple frictional engaging element, a timing solenoid valve in communication with a passage connected to said port, throttle opening sensor means, automobile speed sensor means, control means for operating said timing solenoid valve by signals from said throttle opening sensor means and said automobile speed sensor means, a shift map having a boundary fixed in a range, in which the sensed automobile speed is greater than a predetermined shift line, said throttle opening sensor determining a degree of throttle opening which increases with increasing automobile speed, and an overlap range being fixed between said boundary and said shift line, and an underlap area being fixed in the range where said automobile speed is greater than said boundary, and said control means changing said shift timing valve according to said shift map to open said passage by said timing solenoid valve when a point defined by said degree of throttle opening and said automobile speed is in said overlap area, and to close said passage by said timing solenoid valve and supple an oil pressure to said port when said point is in said underlap area.

2. An automatic transmission shift control device according to claim 1, wherein:

said automatic transmission has three gear operating ratios, said shift timing valve and said timing solenoid valve being associated with the 2→3 shift.

* * * * *